(12) United States Patent
George

(10) Patent No.: US 11,790,506 B2
(45) Date of Patent: Oct. 17, 2023

(54) SYSTEMS AND METHODS FOR IMPROVED CORE SAMPLE ANALYSIS

(71) Applicant: BLY IP INC., Salt Lake City, UT (US)

(72) Inventor: Luke George, Sefton Park (AU)

(73) Assignee: LONGYEAR TM, INC., Salt Lake City, UT (US)

(*) Notice: Subject to any disclaimer, the term of this patent is extended or adjusted under 35 U.S.C. 154(b) by 0 days.

(21) Appl. No.: 18/040,704

(22) PCT Filed: Aug. 4, 2021

(86) PCT No.: PCT/US2021/044529
§ 371 (c)(1),
(2) Date: Feb. 6, 2023

(87) PCT Pub. No.: WO2022/031839
PCT Pub. Date: Feb. 10, 2022

(65) Prior Publication Data
US 2023/0274404 A1    Aug. 31, 2023

Related U.S. Application Data

(60) Provisional application No. 63/062,975, filed on Aug. 7, 2020.

(51) Int. Cl.
*G06T 7/00* (2017.01)
*G06T 7/60* (2017.01)
*G06T 7/11* (2017.01)

(52) U.S. Cl.
CPC .............. *G06T 7/0002* (2013.01); *G06T 7/11* (2017.01); *G06T 7/60* (2013.01);
(Continued)

(58) Field of Classification Search
CPC . G06T 7/0002; G06T 7/11; G06T 7/60; G06T 2207/20081; G06T 2207/20084; G06T 2207/30181
See application file for complete search history.

(56) References Cited

U.S. PATENT DOCUMENTS 9,507,047 B1    11/2016  Dvorkin et al.
11,110,844 B2 *  9/2021  Kanck ................. G01N 23/223
(Continued)

FOREIGN PATENT DOCUMENTS

WO     WO 2019/167030 A1    9/2019

OTHER PUBLICATIONS

International Search Report & Written Opinion for PCT/US2021/044529 (dated Nov. 3, 2021) (18 pages).
(Continued)

*Primary Examiner* — Bobbak Safaipour
(74) *Attorney, Agent, or Firm* — Ballard Spahr LLP

(57) ABSTRACT

Provided herein are methods and systems for improved core sample analysis. At least one image of a core sample may be analyzed to determine structural data associated with the core sample (e.g., attributes of the core sample). A machine learning model may analyze the at least one image and determine one or more attributes associated with the core sample. The machine learning model may generate a segmentation mask. An output image may be generated. A user may interact with the output image and provide one or more user edits. The one or more user edits may be provided to the machine learning model for optimization thereof.

20 Claims, 13 Drawing Sheets

(52) U.S. Cl.
CPC ............... *G06T 2207/20081* (2013.01); *G06T 2207/20084* (2013.01); *G06T 2207/30181* (2013.01)

(56) References Cited

U.S. PATENT DOCUMENTS

| | | |
|---|---|---|
| 2010/0259415 A1 | 10/2010 | Strachan et al. |
| 2011/0088895 A1 | 4/2011 | Pop et al. |
| 2018/0119535 A1 | 5/2018 | Shen et al. |
| 2018/0218214 A1 | 8/2018 | Pestun et al. |

OTHER PUBLICATIONS

Examination Report No. 1 issued by IP Australia dated Jun. 30, 2022 for AU 2021212137 (3 pages).
Notice of Acceptance issued by IP Australia dated Nov. 17, 2022 for AU 2021212137 (3 pages).

\* cited by examiner

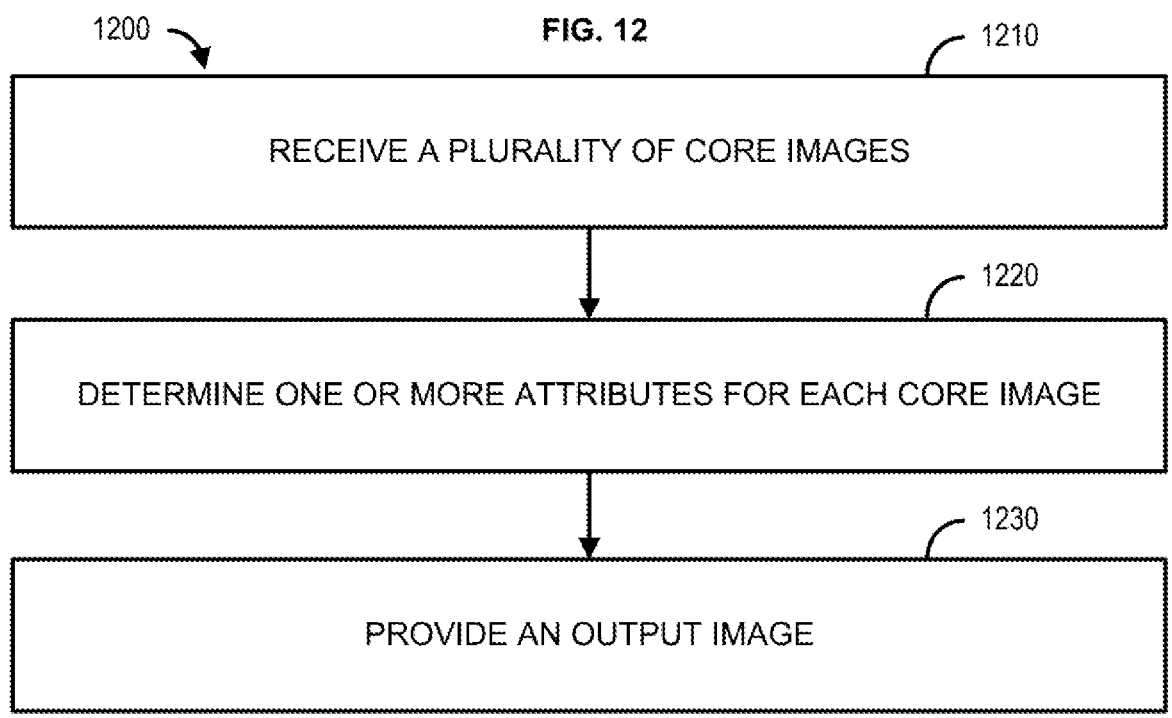

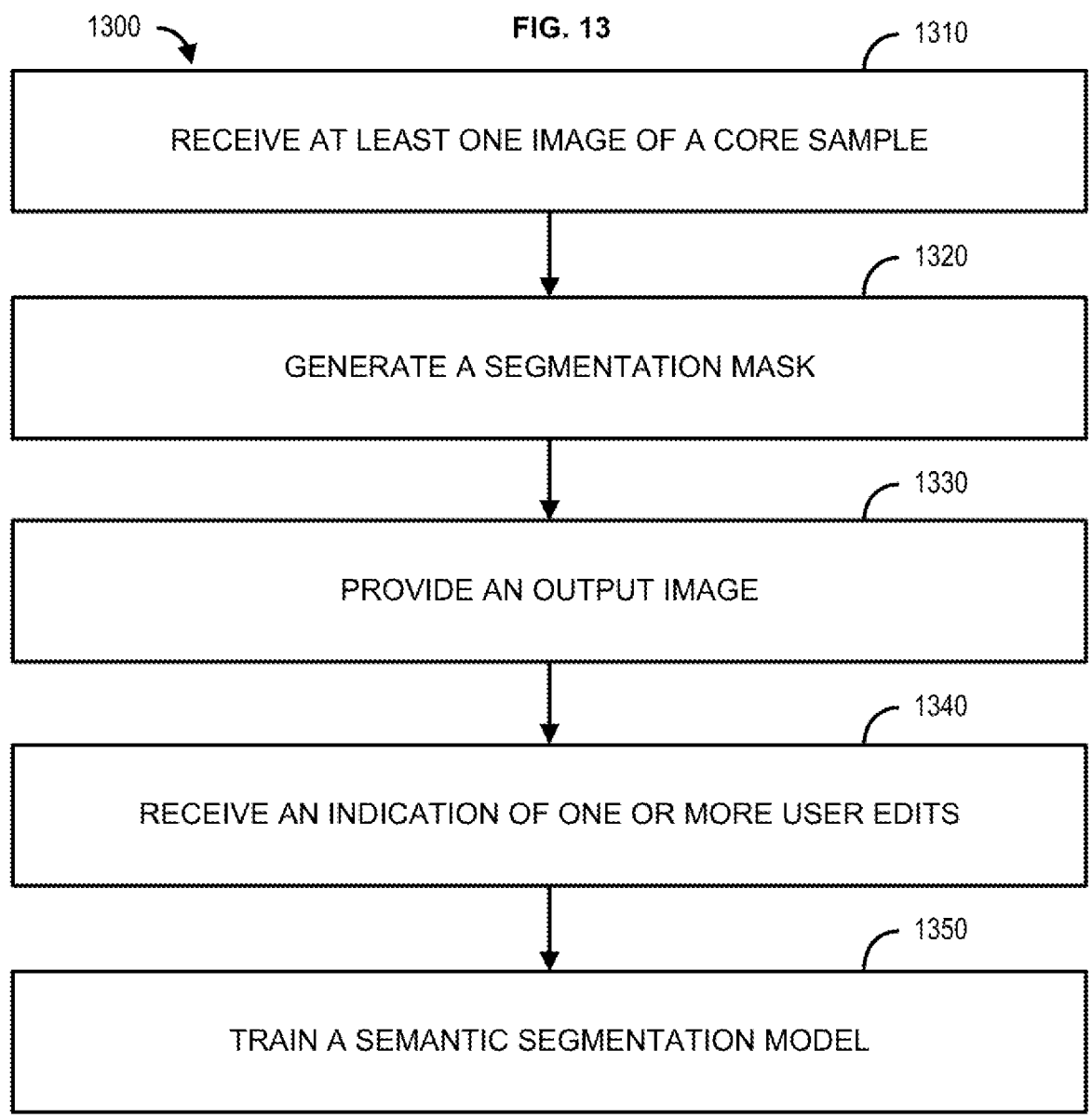

SYSTEMS AND METHODS FOR IMPROVED CORE SAMPLE ANALYSIS

CROSS-REFERENCE TO RELATED PATENT APPLICATION

This application is a U.S. National Phase Application of International Application No. PCT/US2021/044529, filed on Aug. 3, 2021, which claims priority to U.S. Provisional Application No. 63/062,975, which was filed on Aug. 7, 2020, each of which are incorporated by reference in their entireties herein.

BACKGROUND

Typically, analysis of structural features/measurements of drilled or excavated core samples on-site requires tedious and time-consuming labor. On-site analysis may frequently be associated with lengthy transaction times and delays associated with equipment availability, personnel availability, etc. These and other considerations are discussed herein.

SUMMARY

It is to be understood that both the following general description and the following detailed description are exemplary and explanatory only and are not restrictive. Provided herein are methods and systems for improved core sample analysis. At least one image of a core sample may be analyzed to determine structural data associated with the core sample (e.g., attributes of the core sample). The at least one image of the core sample may be generated and uploaded to a server. A machine learning model may analyze the at least one image and determine one or more attributes associated with the core sample. The machine learning model may be a semantic segmentation model, which may use a segmentation algorithm to classify each pixel of the at least one image as either containing or not containing an attribute of the one or more attributes. The machine learning model may use the classification of each pixel to generate a segmentation mask indicating each of the one or more attributes associated with the core sample. An inference model may be used to determine an alpha angle and/or a beta angle associated with at least one attribute of the one or more attributes.

An output image that includes the at least one image of the core sample and an overlay of the segmentation mask may be generated and provided at a user interface. A user may interact with the output image and/or the segmentation mask via the user interface and provide one or more user edits related to the one or more attributes and/or the segmentation mask. Orientation data (e.g., survey/excavation data) associated with the core sample may be used along with the alpha angle and/or the beta angle associated with the at least one attribute to determine a strike angle and/or a dip angle associated with the at least one attribute of the core sample.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 12 shows a flowchart for an example method;
and
FIG. 13 shows a flowchart for an example method.

DETAILED DESCRIPTION

Figure 1:
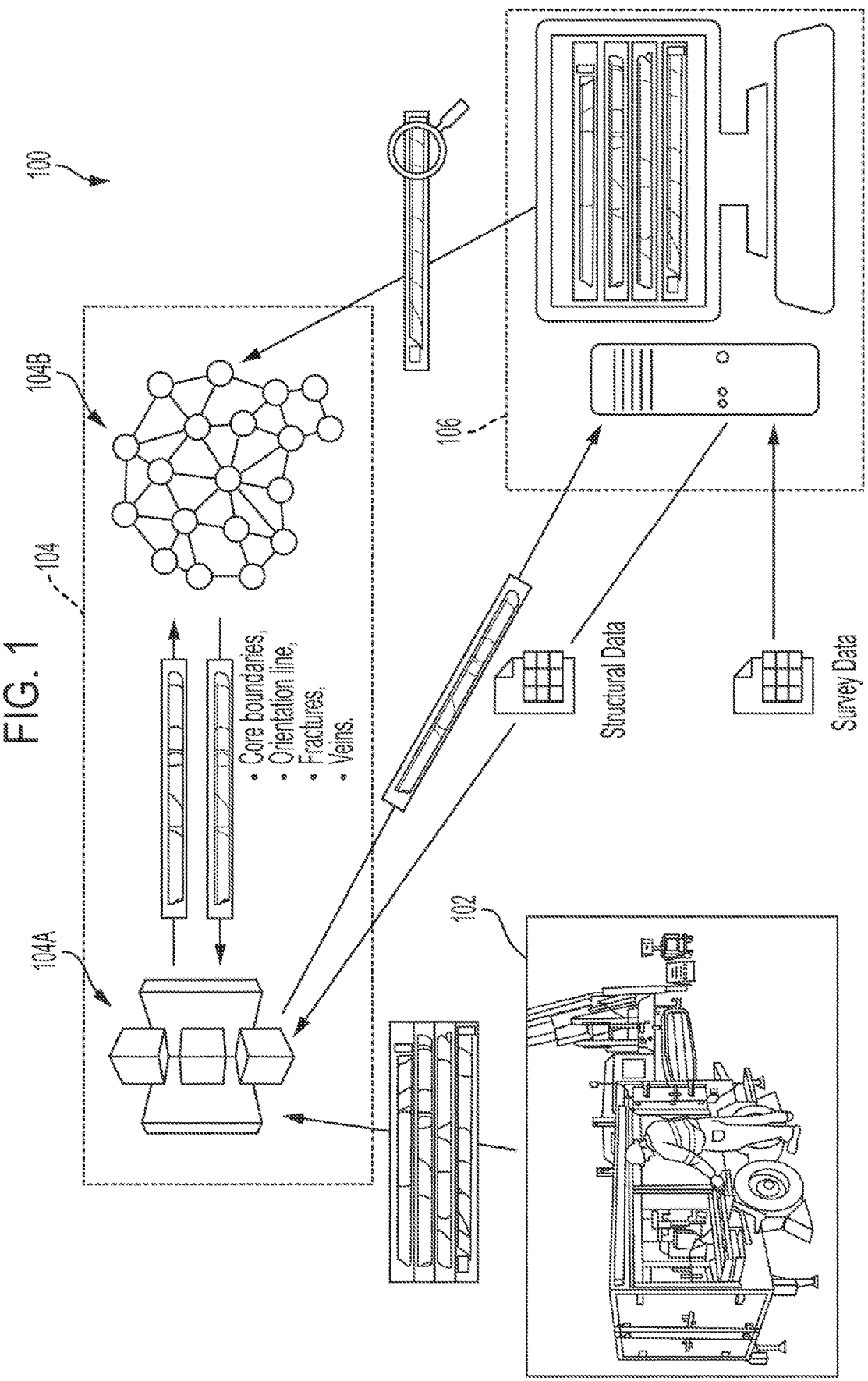
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Provided herein are methods and systems for improved core sample analysis. For example, the present methods and systems provide improved analysis of core sample images using artificial intelligence and machine learning. An image(s) of a core sample may be analyzed to determine structural data (e.g., attributes) associated with the core sample. The image(s) of the core sample may also be analyzed to determine a rock-quality designation (RQD), which may be a rough measure of a degree of jointing or fracture in the sample.

Analysis of images of core samples may be conducted using a web-based or locally-installed application, such as a structural logging application (hereinafter an "application"). Structural data associated with a core sample may be generated using at least one image of the core sample. For example, the application—and backend systems described herein—may analyze as few as one image of the core sample to determine the structural data. As another example, the application may analyze multiple images of the core sample to determine the structural data. The multiple images may be "stitched" together and analyzed as a single overall image of the core sample.

The at least one image of the core sample may be generated at a first location and uploaded to a server (e.g., a "cloud" server). The first location may be, for example, a job/excavation site. When the at least one image is uploaded to the server, a machine learning model may analyze the at least one image and determine one or more attributes associated with the core sample. The machine learning model may be resident on the server, a third-party computing device in communication with the server, or it may be part of the application. The application may be in communication with the server, and the at least one image of the core sample may be retrieved from the server. The one or more attributes may include an orientation line, one or more core boundaries, one or more fractures, one or more veins, one or more broken zones, one or more beddings, a combination thereof, and/or the like. The machine learning model may be a semantic segmentation model, which may use a segmentation algorithm to classify each pixel of the at least one image as either containing or not containing an attribute of the one or more attributes.

The machine learning model may use the classification of each pixel to generate a segmentation mask. The segmentation mask may indicate each of the one or more attributes associated with the core sample. The segmentation mask may be stored at the server and accessible by the application via a network. The application may generate an output image that includes the at least one image of the core sample and an overlay of the segmentation mask. A user of the application may interact with the output image and/or the segmentation mask and provide one or more user edits, such as by adjusting an attribute, modifying an attribute, drawing a position for a new attribute, etc. The one or more user edits may be adjustments to at least one attribute of the one or more attributes and/or at least one adjustment of the overlay of the segmentation mask. The application may provide an indication of the one or more user edits to the server. The one or more user edits and/or expert annotation associated with the one or more user edits may be used to optimize the machine learning model. For example, the one or more user edits and/or expert annotation associated with the one or more user edits may be used to retrain the semantic segmentation model.

An inference model may be used to determine additional attributes associated with the core sample. The inference model may be resident on the server, a third-party computing device in communication with the server, or it may be part of the application. For example, the inference model may generate one or more ellipses associated with at least one of the one or more attributes (e.g., fracture, vein, etc.). The additional attributes may be an alpha angle and/or a beta angle associated with the at least one attribute. For example, the inference model may fit an ellipse to the at least one attribute. Based on an orientation of the ellipse in relation to an orientation line of the core sample and/or edges/boundaries of the core sample, the inference model may determine the alpha angle and/or the beta angle for the at least one attribute. The application may receive orientation data (e.g., survey/excavation data) associated with the core sample. The orientation data may be provided to the application by the user (e.g., via a computing device executing the application), by the server, or by a third-party computing device. The orientation data (e.g., survey/excavation data) associated with the core sample may be used along with the alpha angle and/or the beta angle to determine a strike angle and/or a dip angle associated with the at least one attribute of the core sample. The application may determine a RQD for the core sample based on at least one attribute of the one or more attributes and/or at least one attribute of the additional attributes. The RQD for the core sample, the orientation data, the one or more attributes, and/or the additional attributes may be stored at the server by the application via the network.

Turning now to FIG. 1, an example system 100 for improved core sample analysis 100 is shown. The system 100 may include a job/excavation site 102 having a computing device(s), such as one or more imaging devices, capable of generating a plurality of images for a plurality of core samples. The computing device(s) at the job/excavation site 102 may provide (e.g., upload) the plurality of images to a server 104 via a network. The network may facilitate communication between each device/entity of the system 100. The network may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent/received via the network by any device/entity of the system 100 via a variety of transmission paths, including wireless paths (e.g., satellite paths, Wi-Fi paths, cellular paths, etc.) and terrestrial paths (e.g., wired paths, a direct feed source via a direct line, etc.).

The server 104 may be a single computing device or a plurality of computing devices. As shown in FIG. 1, the server may include a storage module 104A and a machine learning module 104B. The system 100 may also include a computing device 106. The computing device 106 may be in communication with the server 104 and/or the computing device(s) at the job/excavation site 102. Analysis of images of core samples may be facilitated using a web-based or locally-installed application, such as a structural logging application (hereinafter an "application"), executing or otherwise controlled by the computing device 106. The computing device 106 may use the application to determine structural data associated with a core sample using at least one image of the core sample. For example, as few as one image of the core sample may be analyzed to determine the structural data. As another example, multiple images of the core sample may be analyzed to determine the structural data. The multiple images may be "stitched" together and analyzed as a single overall image of the core sample.

As described herein, the computing device(s) at the job/excavation site 102 may provide (e.g., upload) the plurality of images to the server 104 via the network. When the plurality of images are uploaded to the server 104, the machine learning module 104B may analyze the plurality of images and determine one or more attributes associated with each of the corresponding core samples. As described further herein with respect to FIGS. 2-6, the one or more attributes may include an orientation line, one or more core boundaries, one or more fractures, one or more veins, one or more broken zones, one or more beddings, a combination thereof, and/or the like. The machine learning module 104B may comprise a semantic segmentation model (e.g., a segmentation algorithm). The machine learning module 104B may use the semantic segmentation model to classify each pixel of each of the plurality of images to determine whether each pixel contains or does not contain an attribute of the one or more attributes. For example, the semantic segmentation model may classify a number of pixels of a core image as containing (e.g., depicting a portion of) a fracture of the corresponding core sample.

The machine learning module 104B may use the classification of each pixel of each of the plurality of images to generate a segmentation mask for each of the plurality of images. A segmentation mask for an image may indicate each of the one or more attributes associated with the corresponding core sample. The segmentation mask may be stored at the server 104 and accessible by the application and the computing device 106 via the network. For example, the computing device 106 may receive the segmentation mask for an image via the application, and the application and/or the server 104 may generate an output image to be displayed via a user interface of the application. The output image may include the image of the core sample and an overlay of the segmentation mask.

Figure 2:
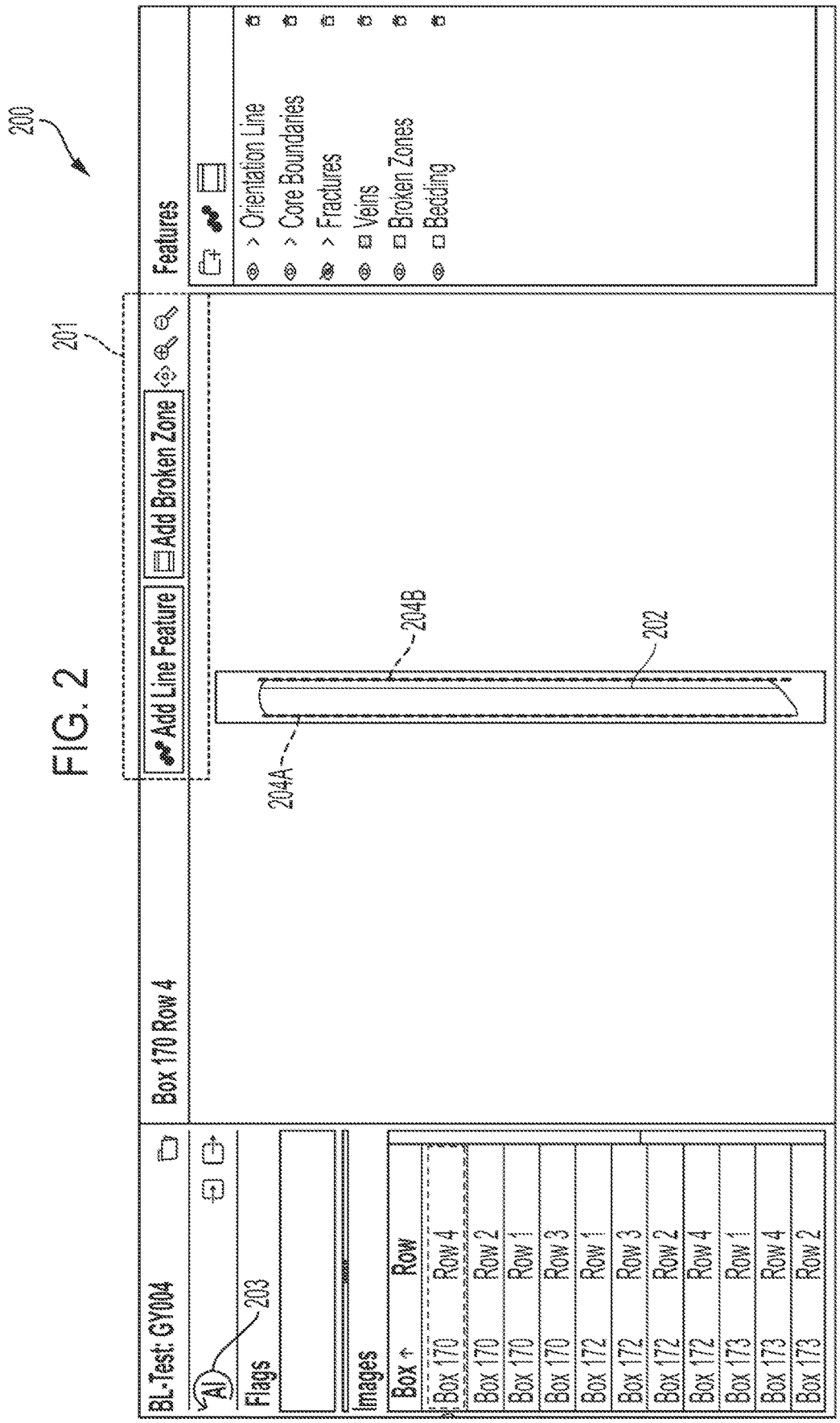
FIG. 2 shows an example user interface.

FIG. 2 shows an example first view 200 of a user interface of the application executing on the computing device 106. As shown in FIG. 2, the first view 200 of the user interface may include an output image containing an image of a core sample and one or more attributes associated with the core sample, such as an orientation line of the core sample as well as boundaries (e.g., edges) of the core sample. The one or more attributes may be provided in the output image via the segmentation mask. The segmentation mask in FIG. 2 indicates the orientation line 202 as well as the core boundaries (e.g., edges) 204A and 204B. The orientation line 202 may comprise a line formed through an intersection of a vertical plane and an edge of the core sample where the vertical plane passes through an axis of the core sample. The orientation line 202 may be a line that is parallel to the axis of the core sample, representing a bottom most point—or a top most point—of the core sample. As described herein, the user interface may include a plurality of editing tools 201 that facilitate a user interacting with the output image and/or the segmentation mask for a core sample. The user may revert to the output image as originally shown via a button 203.

Figure 3:
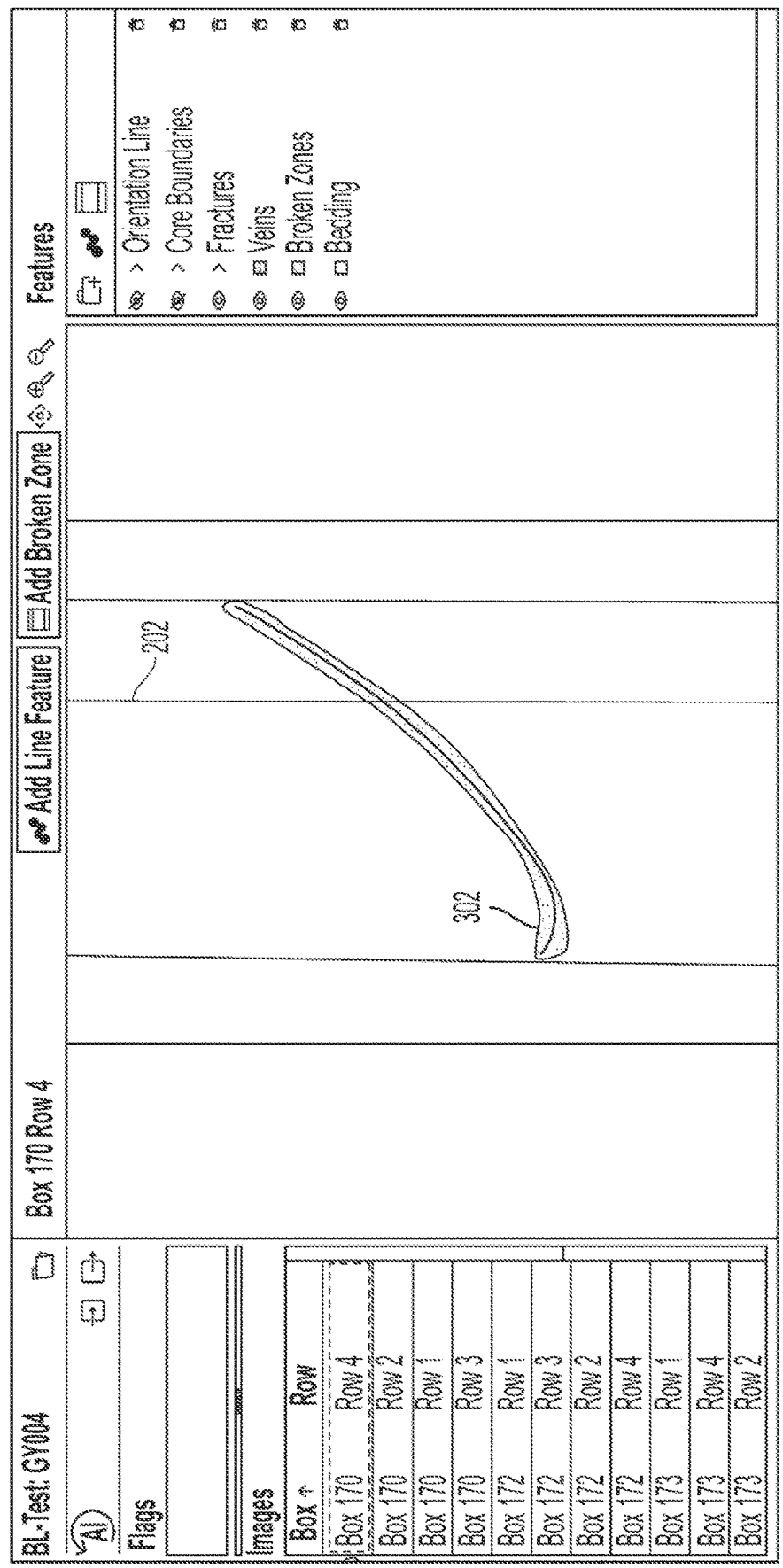
FIG. 3 shows an example user interface.

FIG. 3 shows an example second view 300 of the user interface. As shown in FIG. 3, the second view 300 of the user interface may include an output image containing an image of a core sample and one or more attributes associated with the core sample, such as the orientation line 202 of the core sample as well a fracture 302 within the core sample. The one or more attributes may be provided in the output image via the segmentation mask. The fracture 302 may be any physical break or separation in the core sample that is caused by (e.g., formed by) natural means (e.g., faults, joints, etc.) or artificial means (e.g., mechanical breaks due to drilling, etc.).

Figure 4:
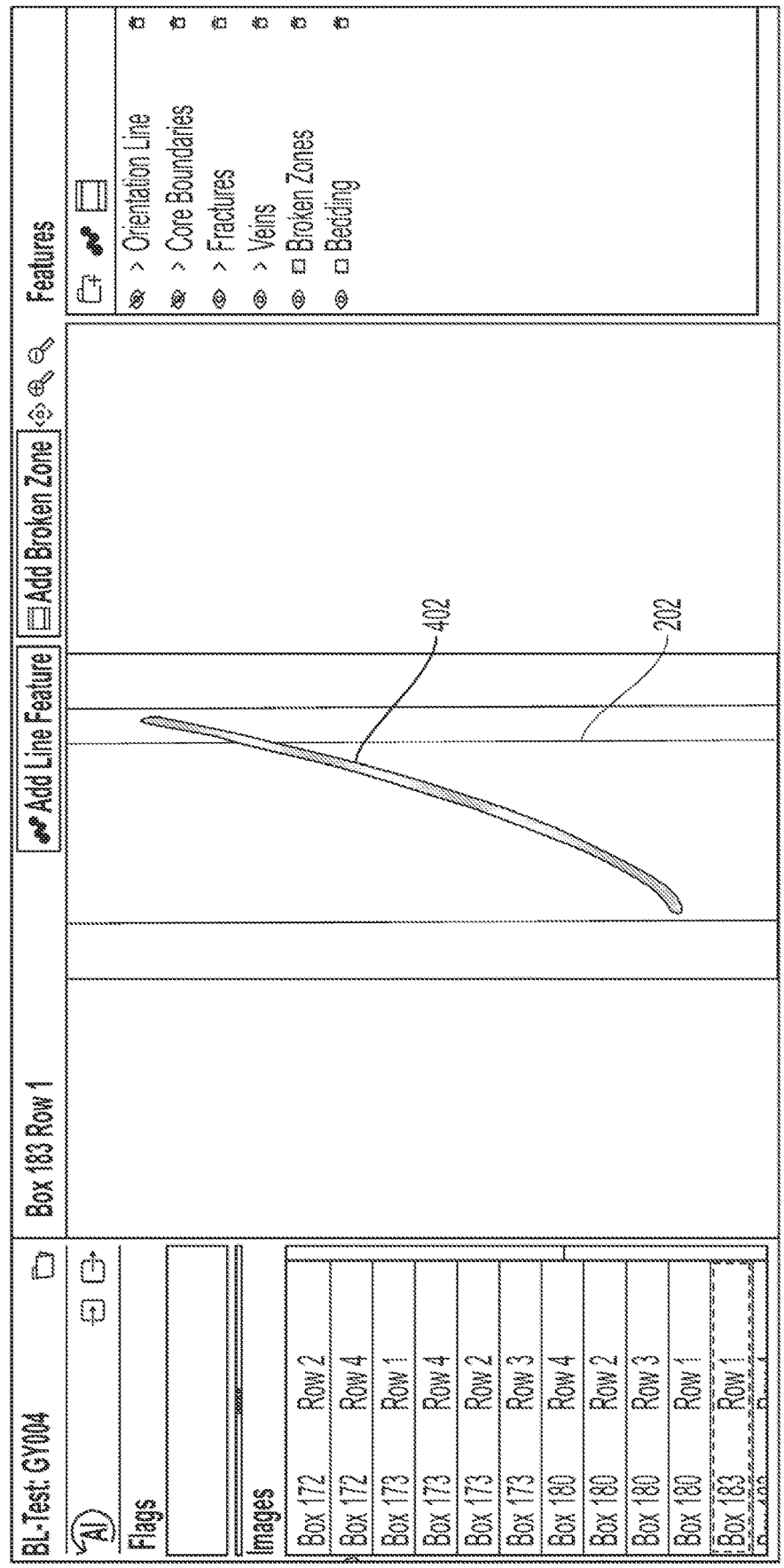
FIG. 4 shows an example user interface.

FIG. 4 shows an example third view 400 of the user interface. As shown in FIG. 4, the third view 400 of the user interface may include an output image containing an image of a core sample and one or more attributes associated with the core sample, such as the orientation line 202 of the core sample as well a vein 402 within the core sample. The one or more attributes may be provided in the output image via the segmentation mask. The vein 402 may be any sheet-like body of a mineral or mineral assemblage that is distinct either compositionally or texturally within the core sample.

Figure 5:
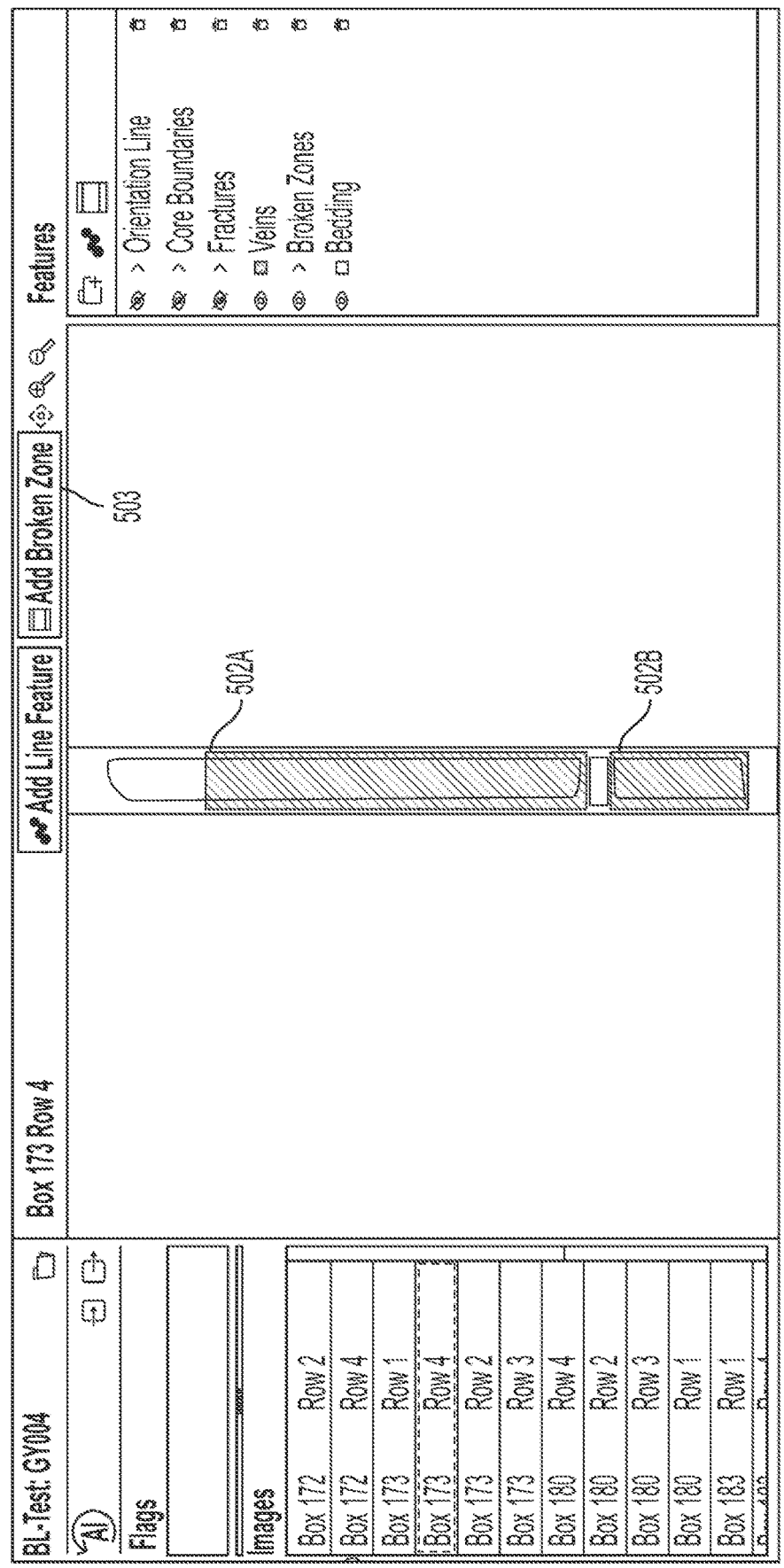
FIG. 5 shows an example user interface.

FIG. 5 shows an example fourth view 500 of the user interface. As shown in FIG. 5, the fourth view 500 of the user interface may include an output image containing an image of a core sample and one or more attributes associated with the core sample, such as a first broken zone 502A and a second broken zone 502B. The one or more attributes may be provided in the output image via the segmentation mask. Each of the first broken zone 502A and the second broken zone 502B may be an area of the core sample that is sufficiently broken up into multiple pieces.

Figure 6:
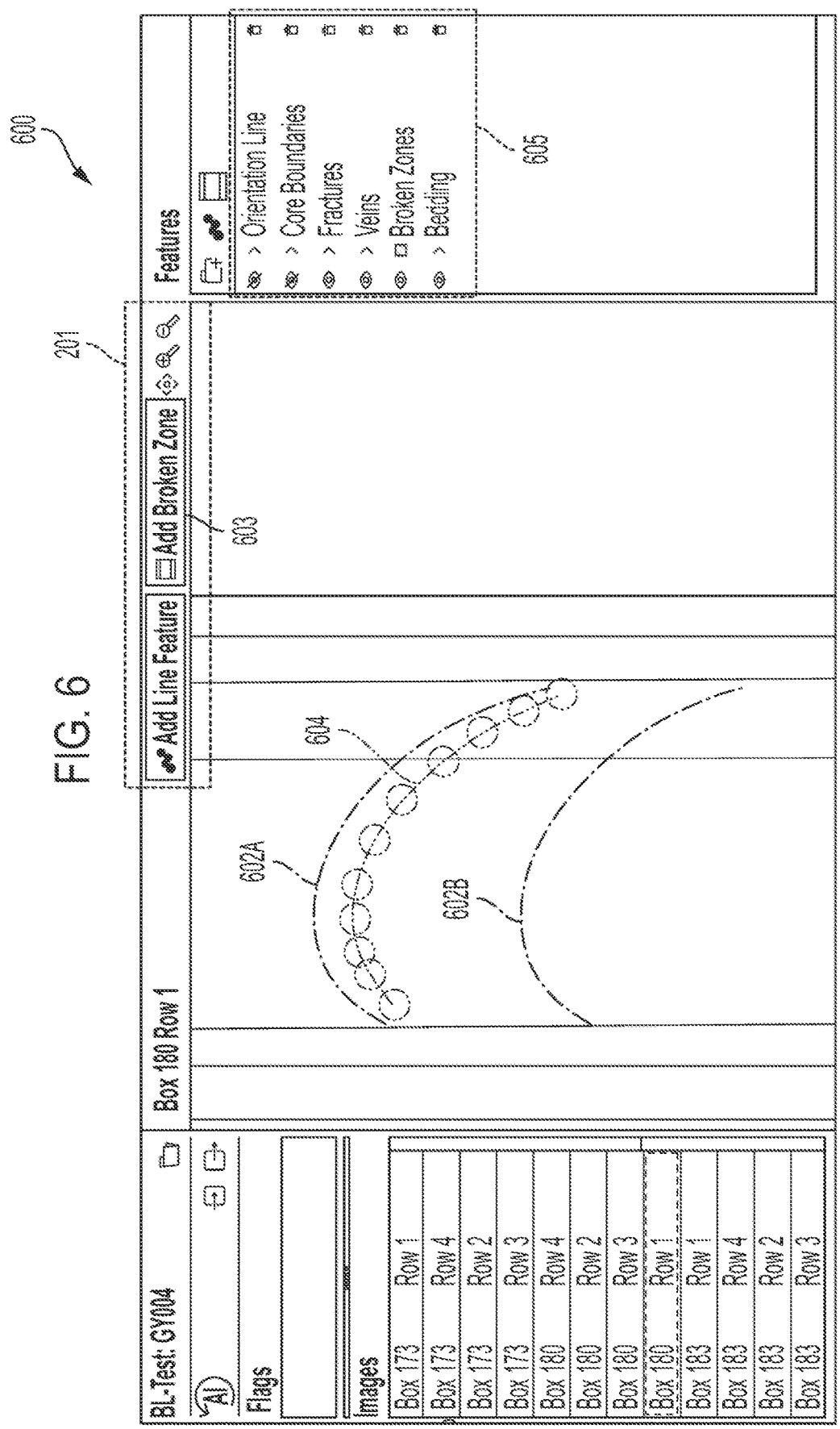
FIG. 6 shows an example user interface.

FIG. 6 shows an example fifth view 600 of the user interface. As shown in FIG. 6, the fifth view 600 of the user interface may include an output image containing an image of a core sample and one or more attributes associated with the core sample, such as a first bedding 602A and a second bedding 602B. The one or more attributes may be provided in the output image via the segmentation mask. FIG. 6. Each of the first bedding 602A and the second bedding 602B may be layers of sedimentary rock within the core sample that are distinct either compositionally or texturally from underlying and/or overlying rock within the core sample.

As described herein, the user interface may include a plurality of editing tools 201 that facilitate the user interacting with the output image and/or the segmentation mask for a core sample. The user may interact with the output image and/or the segmentation mask and provide one or more user edits, such as by adjusting an attribute, modifying an attribute, drawing a position for a new attribute, etc. The one or more user edits may be adjustments to at least one attribute of the one or more attributes and/or at least one adjustment of the overlay of the segmentation mask. For example, as shown in FIG. 6, a first tool 603 of the plurality of tools 201 may allow the user to create a user-defined attribute associated with the core sample by drawing a line over a portion of the output image. As shown in FIG. 6, the first tool 603 may allow the user to draw a user-defined attribute 604. The user interface may include a list of attribute categories 605 that allow the user to categorize the user-defined attribute 604. In the example shown in FIG. 6, the user-defined attribute 604 is an additional bedding; however, any category of user-defined attribute may be added using the plurality of tools 201. The user may also modify and/or delete any attribute indicated by the segmentation mask.

The application may provide an indication of one or more user edits made to any of the attributes indicated by the segmentation mask (or any created or deleted attributes) to the server 104. Expert annotation may be provided to the server 104 by a third-party computing device (not shown). The expert annotation may be associated with the one or more user edits. For example, the expert annotation may comprise an indication of an acceptance of the one or more user edits, a rejection of the one or more user edits, or an adjustment to the one or more user edits. The one or more user edits and/or the expert annotation may be used by the machine learning module 104B to optimize the semantic segmentation model. For example, the one or more user edits and/or the expert annotation may be used by the machine learning module 104B to retrain the semantic segmentation model.

Figure 7:
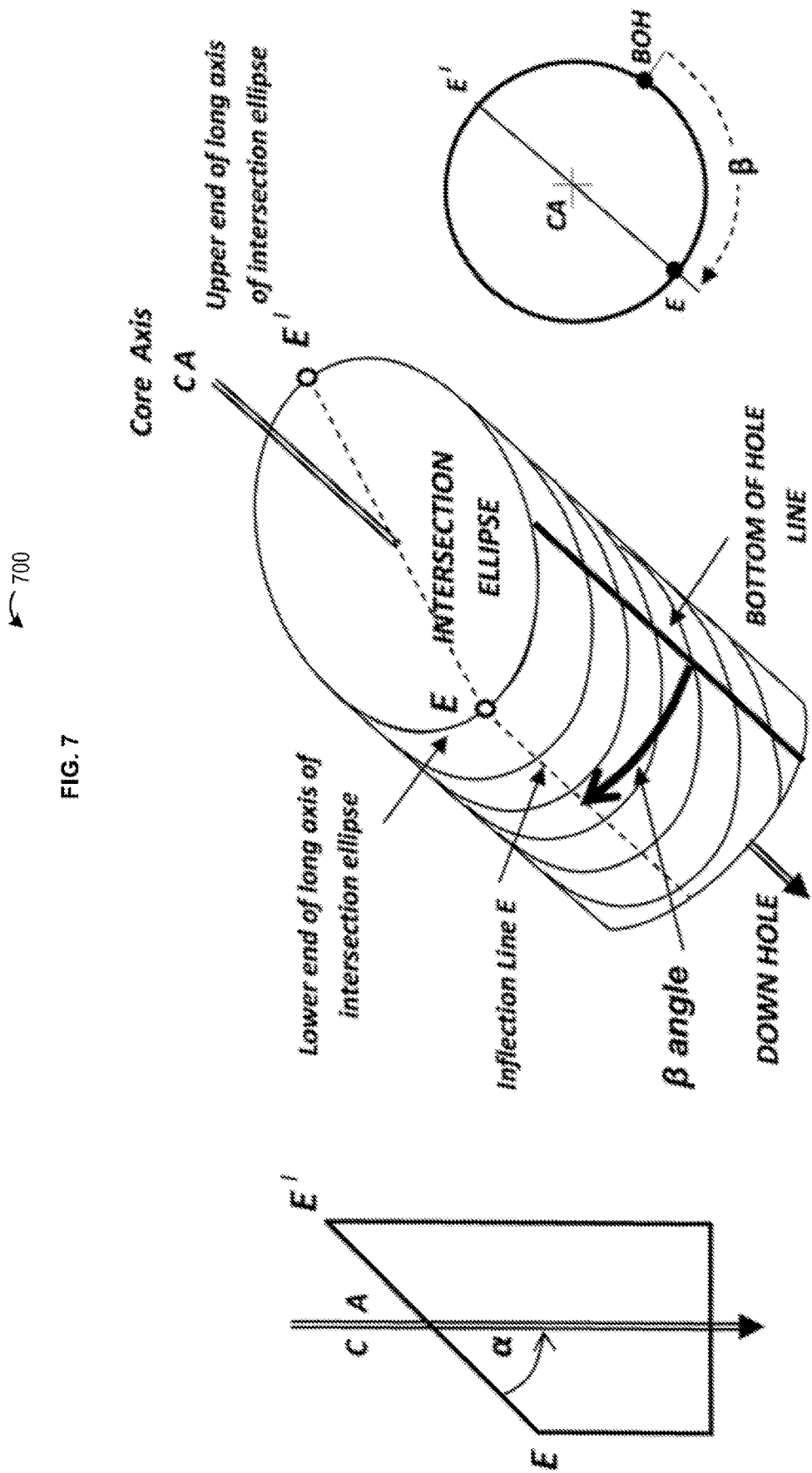
FIG. 7 shows example orientation data.

The machine learning module 104B may utilize an inference model. The inference model may be resident on the server 104, the computing device 106, or a third-party computing device in communication with the server 104 and/or the computing device 106. The inference model may be used by the machine learning module 104B to determine additional attributes associated with the core sample. For example, the machine learning module 104B may use the inference model to generate one or more ellipses associated with at least one of the one or more attributes (e.g., fracture, vein, etc.). The additional attributes may be an alpha angle and/or a beta angle associated with the at least one attribute. For example, the inference model may fit an ellipse to the at least one attribute as shown in FIG. 7. Based on an orientation of the ellipse in relation to an orientation line of the core sample and/or edges/boundaries of the core sample, the inference model may determine the alpha angle and/or the beta angle for the at least one attribute. The alpha angle may be an acute angle created by an axis of the core sample (CA) and a line passing through a bottom most and topmost points on the ellipse, E. The beta angle may be measured clockwise around a circumference of the core sample between the orientation line of the core sample and the bottommost point on the ellipse, E.

The system 100 may receive orientation data (e.g., survey/excavation data) associated with the core sample. The orientation data may be provided to the system 100 by the user via the computing device 106, by the server 104, or by a third-party computing device (not shown). The orientation data may be used along with the alpha angle and/or the beta angle for the at least one attribute to determine a strike angle and/or a dip angle associated with the at least one attribute of the core sample. For example, the orientation data may be used to convert the alpha angle and/or the beta angle into the strike angle and/or the dip angle associated with the core sample. The computing device 106 and/or the server 104 may determine a rock-quality designation (RQD) for the core sample based at least one attribute of the one or more attributes and/or at least one attribute of the additional attributes. The RQD for the core sample may be a rough measure of a degree of jointing or fracture in the core sample. The RQD for the core sample, the orientation data, the one or more attributes, and/or the additional attributes may be stored at the server 104 and/or at the computing device 106 via the application and the network.

As discussed herein, the computing device 106 and/or the server 104 may use a segmentation model when analyzing an image(s) of a core sample. The segmentation model may be a result of applying one or more machine learning models and/or algorithms to images associated with a plurality of core samples. Machine learning is a subfield of computer science that gives computers the ability to learn without being explicitly programmed. Machine learning platforms include, but are not limited to, naïve Bayes classifiers, support vector machines, decision trees, neural networks, and the like.

For example, the computing device 106 and/or the server 104 may be used to receive and analyze a plurality of core images associated with a plurality of core samples using one or more machine learning models and/or algorithms. Each of the plurality of core images may include one or more features. The plurality of images may include a first portion ("first core images") and a second portion ("second core images"). The second core images may include core images that are labeled as either having a particular attribute(s) or as not having the particular attribute(s). The computing device 106 and/or the server 104 may utilize the one or more machine learning models and/or algorithms to determine which of the one or more features of the core images are most closely associated with an image having the particular attribute(s) versus not having the particular attribute(s) (or vice-versa). Using those closely associated features, the computing device may generate a segmentation model. The segmentation model (e.g., a machine learning classifier) may be generated to classify portions of a core image as having particular attribute(s) based on analyzing pixels of the core image.

As used herein, the term "segmentation" refers to analysis of a core image to determine related areas of the core image. In some cases, segmentation is based on semantic content of the core image. For example, segmentation analysis performed on a core image may indicate a region of the core image depicting a particular attribute(s) of the corresponding core sample. In some cases, segmentation analysis produces segmentation data. The segmentation data may indicate one or more segmented regions of the analyzed core image. For example, the segmentation data may include a set of labels, such as pairwise labels (e.g., labels having a value indicating "yes" or "no") indicating whether a given pixel in the core image is part of a region depicting a particular attribute(s) of the corresponding core sample. In some cases, labels may have multiple available values, such as a set of labels indicating whether a given pixel depicts a first attribute, a second attribute, a combination of attributes, and so on. The segmentation data may include numerical data, such as data indicating a probability that a given pixel is a region depicting a particular attribute(s) of the corresponding core sample. In some cases, the segmentation data may include additional types of data, such as text, database records, or additional data types, or structures.

Figure 8:
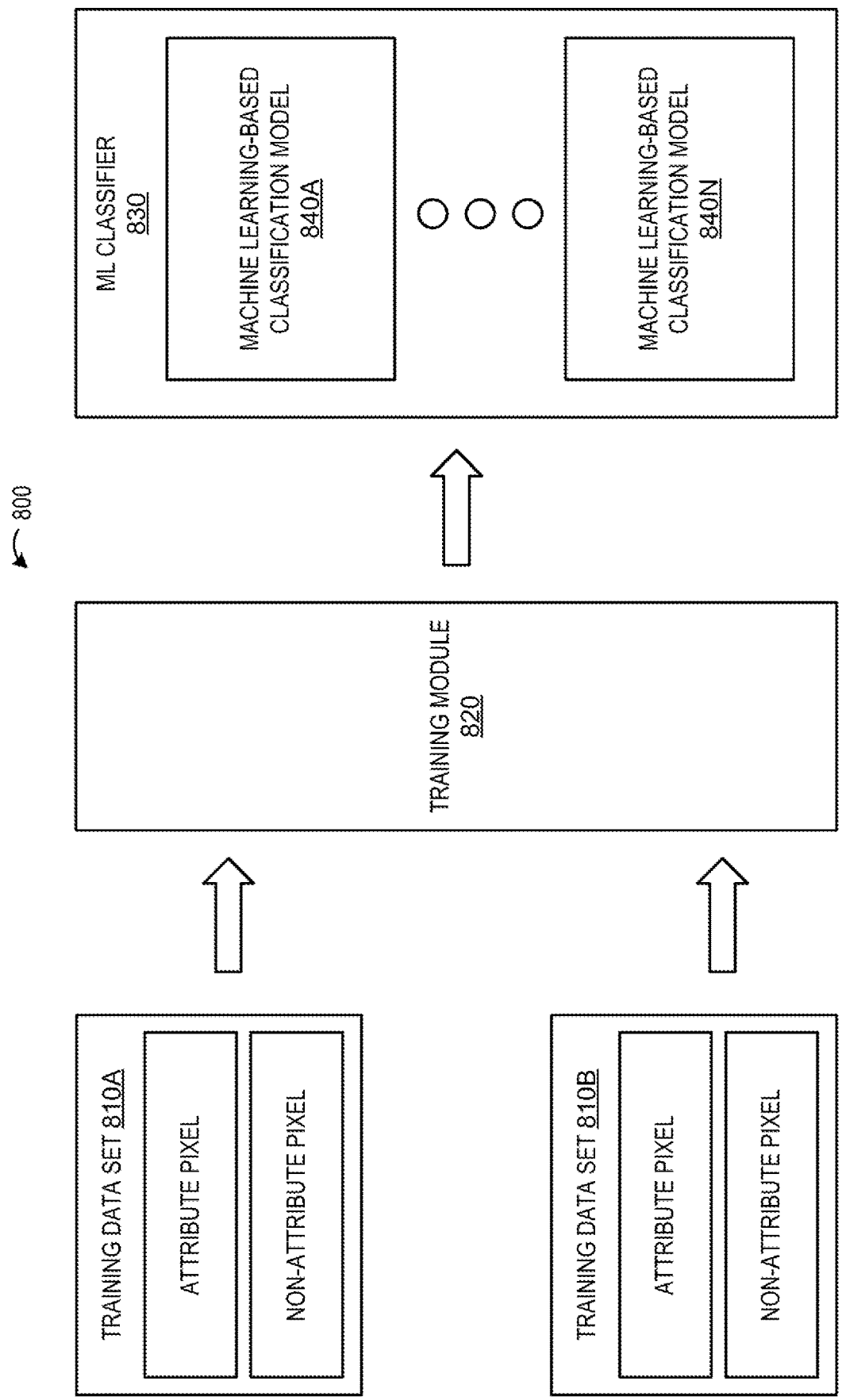
FIG. 8 shows an example system.

Turning now to FIG. 8, a system 800 is shown. The system 800 may be configured to use machine learning techniques to train, based on an analysis of one or more training data sets 810A-810B by a training module 820, at least one machine learning-based classifier 830 that is configured to classify pixels in a core image as depicting or not depicting a particular attribute(s) of a corresponding core sample. The training data set 810A (e.g., a first portion of the second core images) may comprise labeled portions of images (e.g., labeled as depicting or not depicting a particular attribute(s) of a corresponding core sample). The training data set 810B (e.g., a second portion of the second core images) may also comprise labeled imaging results (e.g., labeled as depicting or not depicting a particular attribute(s) of a corresponding core sample). The labels may comprise "attribute pixel" and "non-attribute pixel."

The second portion of the second core images may be randomly assigned to the training data set 810B or to a testing data set. In some implementations, the assignment of data to a training data set or a testing data set may not be completely random. In this case, one or more criteria may be used during the assignment, such as ensuring that similar numbers of core images with different labels are in each of the training and testing data sets. In general, any suitable method may be used to assign the data to the training or testing data sets, while ensuring that the distributions of sufficient quality and insufficient quality labels are somewhat similar in the training data set and the testing data set.

The training module 820 may train the machine learning-based classifier 830 by extracting a feature set from the first portion of the second core images in the training data set 810A according to one or more feature selection techniques. The training module 820 may further define the feature set obtained from the training data set 810A by applying one or more feature selection techniques to the second portion of the second core data in the training data set 810B that includes statistically significant features of positive examples (e.g., pixels depicting a particular attribute(s) of a corresponding core sample) and statistically significant features of negative examples (e.g., pixels not depicting a particular attribute(s) of a corresponding core sample).

The training module 820 may extract a feature set from the training data set 810A and/or the training data set 810B in a variety of ways. The training module 820 may perform feature extraction multiple times, each time using a different feature-extraction technique. In an embodiment, the feature sets generated using the different techniques may each be used to generate different machine learning-based classification models 840. For example, the feature set with the highest quality metrics may be selected for use in training. The training module 820 may use the feature set(s) to build one or more machine learning-based classification models 840A-840N that are configured to indicate whether or not new core images contain or do not contain pixels depicting a particular attribute(s) of the corresponding core samples.

The training data set 810A and/or the training data set 810B may be analyzed to determine any dependencies, associations, and/or correlations between extracted features and the sufficient quality/insufficient quality labels in the training data set 810A and/or the training data set 810B. The identified correlations may have the form of a list of features that are associated with labels for pixels depicting a particular attribute(s) of a corresponding core sample and labels for pixels not depicting the particular attribute(s) of the corresponding core sample. The features may be considered as variables in the machine learning context. The term "feature," as used herein, may refer to any characteristic of an item of data that may be used to determine whether the item of data falls within one or more specific categories. By way of example, the features described herein may comprise one or more pixel attributes. The one or more pixel attributes may include a level of color saturation, a hue, a contrast level, a relative position, a combination thereof, and/or the like.

A feature selection technique may comprise one or more feature selection rules. The one or more feature selection rules may comprise a pixel attribute and a pixel attribute occurrence rule. The pixel attribute occurrence rule may comprise determining which pixel attributes in the training data set 810A occur over a threshold number of times and identifying those pixel attributes that satisfy the threshold as candidate features. For example, any pixel attributes that appear greater than or equal to 8 times in the training data set 810A may be considered as candidate features. Any pixel attributes appearing less than 8 times may be excluded from consideration as a feature. Any threshold amount may be used as needed.

A single feature selection rule may be applied to select features or multiple feature selection rules may be applied to select features. The feature selection rules may be applied in a cascading fashion, with the feature selection rules being applied in a specific order and applied to the results of the previous rule. For example, the pixel attribute occurrence rule may be applied to the training data set 810A to generate a first list of pixel attributes. A final list of candidate features may be analyzed according to additional feature selection techniques to determine one or more candidate groups (e.g., groups of pixel attributes). Any suitable computational technique may be used to identify the candidate feature groups using any feature selection technique such as filter, wrapper, and/or embedded methods. One or more candidate feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms. Instead, features may be selected on the basis of scores in various statistical tests for their correlation with the outcome variable (e.g., pixels that depict or do not depict a particular attribute(s) of a corresponding core sample).

As another example, one or more candidate feature groups may be selected according to a wrapper method. A wrapper method may be configured to use a subset of features and train a machine learning model using the subset of features. Based on the inferences that drawn from a previous model, features may be added and/or deleted from the subset. Wrapper methods include, for example, forward feature selection, backward feature elimination, recursive feature elimination, combinations thereof, and the like. In an embodiment, forward feature selection may be used to identify one or more candidate feature groups. Forward feature selection is an iterative method that begins with no features in the machine learning model. In each iteration, the feature which best improves the model is added until an addition of a new feature does not improve the performance of the machine learning model. In an embodiment, backward elimination may be used to identify one or more candidate feature groups. Backward elimination is an iterative method that begins with all features in the machine learning model. In each iteration, the least significant feature is removed until no improvement is observed on removal of features. Recursive feature elimination may be used to identify one or more candidate feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 820 has generated a feature set(s), the training module 820 may generate a machine learning-based classification model 840 based on the feature set(s). A machine learning-based classification model may refer to a complex mathematical model for data classification that is generated using machine-learning techniques. In one example, this machine learning-based classifier may include a map of support vectors that represent boundary features. By way of example, boundary features may be selected from, and/or represent the highest-ranked features in, a feature set.

The training module 820 may use the feature sets extracted from the training data set 810A and/or the training data set 810B to build a machine learning-based classification model 840A-840N for each classification category (e.g., each attribute of a corresponding core sample). In some examples, the machine learning-based classification models 840A-840N may be combined into a single machine learning-based classification model 840. Similarly, the machine learning-based classifier 830 may represent a single classifier containing a single or a plurality of machine learning-based classification models 840 and/or multiple classifiers containing a single or a plurality of machine learning-based classification models 840.

The extracted features (e.g., one or more pixel attributes) may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning-based classifier 830 may comprise a decision rule or a mapping for each candidate pixel attribute to assign a pixel(s) to a class (e.g., depicting or not depicting a particular attribute(s) of a corresponding core sample).

The candidate pixel attributes and the machine learning-based classifier 830 may be used to predict a label (e.g., depicting or not depicting a particular attribute(s) of a corresponding core sample) for imaging results in the testing data set (e.g., in the second portion of the second core images). In one example, the prediction for each imaging result in the testing data set includes a confidence level that corresponds to a likelihood or a probability that the corresponding pixel(s) depicts or does not depict a particular attribute(s) of a corresponding core sample. The confidence level may be a value between zero and one, and it may represent a likelihood that the corresponding pixel(s) belongs to a particular class. In one example, when there are two statuses (e.g., depicting or not depicting a particular attribute(s) of a corresponding core sample), the confidence level may correspond to a value p, which refers to a likelihood that a particular pixel belongs to the first status (e.g., depicting the particular attribute(s)). In this case, the value 1−p may refer to a likelihood that the particular pixel belongs to the second status (e.g., not depicting the particular attribute(s)). In general, multiple confidence levels may be provided for each pixel and for each candidate pixel attribute when there are more than two statuses. A top performing candidate pixel attribute may be determined by comparing the result obtained for each pixel with the known sufficient quality/insufficient quality status for each corresponding core image in the testing data set (e.g., by comparing the result obtained for each pixel with the labeled core images of the second portion of the second core images). In general, the top performing candidate pixel attribute for a particular attribute(s) of the corresponding core sample will have results that closely match the known depicting/not depicting statuses.

The top performing pixel attribute may be used to predict the depicting/not depicting of pixels of a new core image. For example, a new core image may be determined/received. The new core image may be provided to the machine learning-based classifier 830 which may, based on the top performing pixel attribute for the particular attribute(s) of the corresponding core sample, classify the pixels of the new core image as depicting or not depicting the particular attribute(s).

As noted above regarding FIG. 6, the application may provide an indication of one or more user edits made to any of the attributes indicated by the segmentation mask (or any created or deleted attributes) to the server 104. For example, the user may edit any of the attributes indicated by the segmentation mask by dragging some of its points to desired positions via mouse movements in order to optimally delineate depictions of boundaries of the attribute(s). As another example, the user may draw or redraw parts of the segmentation mask via a mouse. Other input devices or methods of obtaining user commands may also be used. The one or more user edits may be used by the machine learning module 104B to optimize the semantic segmentation model. For example, the training module 820 may extract one or more features from output images containing one or more user edits as discussed above. The training module 820 may use the one or more features to retrain the machine learning-based classifier 830 and thereby continually improve results provided by the machine learning-based classifier 830.

Figure 9:
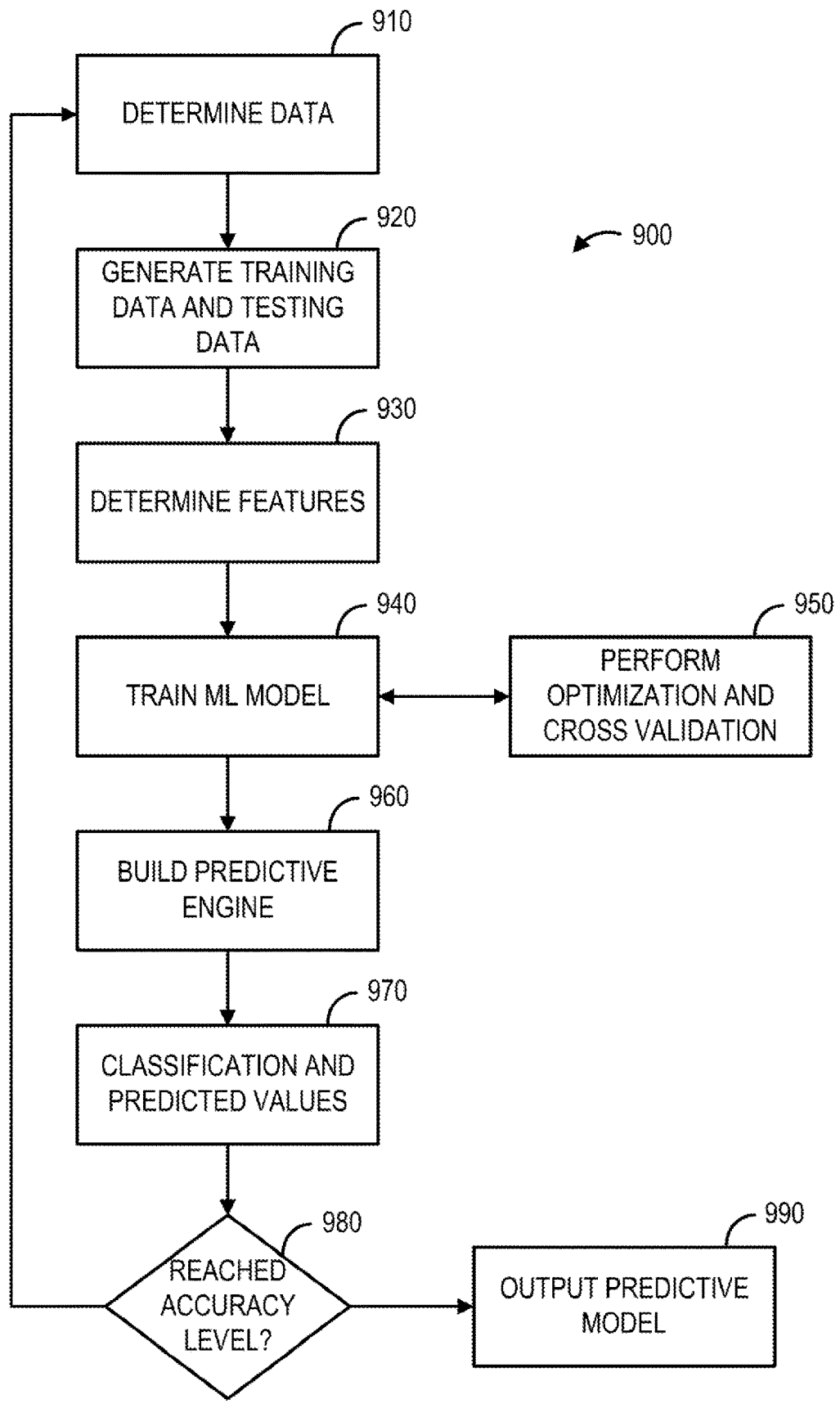
FIG. 9 shows an example process flowchart.

Turning now to FIG. 9, a flowchart illustrating an example training method 900 is shown. The method 900 may be used for generating the machine learning-based classifier 830 using the training module 820. The training module 820 can implement supervised, unsupervised, and/or semi-supervised (e.g., reinforcement based) machine learning-based classification models 840. The method 900 illustrated in FIG. 9 is an example of a supervised learning method; variations of this example of training method are discussed below, however, other training methods can be analogously implemented to train unsupervised and/or semi-supervised machine learning models.

The training method 900 may determine (e.g., access, receive, retrieve, etc.) first core images associated with a plurality of core samples (e.g., first core samples) and second core images associated with the plurality of core samples (e.g., second core samples) at step 910. The first core samples and the second core samples may each contain one or more imaging result datasets associated with core images, and each imaging result dataset may be associated with a particular attribute. Each imaging result dataset may include a labeled list of imaging results. The labels may comprise "attribute pixel" and "non-attribute pixel."

The training method 900 may generate, at step 920, a training data set and a testing data set. The training data set and the testing data set may be generated by randomly assigning labeled imaging results from the second core images to either the training data set or the testing data set. In some implementations, the assignment of labeled imaging results as training or test samples may not be completely random. In an embodiment, only the labeled imaging results for a specific core type and/or class may be used to generate the training data set and the testing data set. In an embodiment, a majority of the labeled imaging results for the specific core type and/or class may be used to generate the training data set. For example, 75% of the labeled imaging results for the specific core type and/or class may be used to generate the training data set and 25% may be used to generate the testing data set.

The training method 900 may determine (e.g., extract, select, etc.), at step 930, one or more features that can be used by, for example, a classifier to differentiate among different classifications (e.g., "attribute pixel" and "non-attribute pixel."). The one or more features may comprise a set of imaging result attributes. In an embodiment, the training method 900 may determine a set features from the first core images. In another embodiment, the training method 900 may determine a set of features from the second core images. In a further embodiment, a set of features may be determined from labeled imaging results from a core type and/or class different than the core type and/or class associated with the labeled imaging results of the training data set and the testing data set. In other words, labeled imaging results from the different core type and/or class may be used for feature determination, rather than for training a machine learning model. The training data set may be used in conjunction with the labeled imaging results from the different core type and/or class to determine the one or more features. The labeled imaging results from the different core type and/or class may be used to determine an initial set of features, which may be further reduced using the training data set.

The training method 900 may train one or more machine learning models using the one or more features at step 940. In one embodiment, the machine learning models may be trained using supervised learning. In another embodiment, other machine learning techniques may be employed, including unsupervised learning and semi-supervised. The machine learning models trained at 940 may be selected based on different criteria depending on the problem to be solved and/or data available in the training data set. For example, machine learning classifiers can suffer from different degrees of bias. Accordingly, more than one machine learning model can be trained at 940, and then optimized, improved, and cross-validated at step 950.

The training method 900 may select one or more machine learning models to build a predictive model at 960 (e.g., a machine learning classifier). The predictive model may be evaluated using the testing data set. The predictive model may analyze the testing data set and generate classification values and/or predicted values at step 970. Classification and/or prediction values may be evaluated at step 980 to determine whether such values have achieved a desired accuracy level.

Performance of the predictive model described herein may be evaluated in a number of ways based on a number of true positives, false positives, true negatives, and/or false negatives classifications of pixels in images of core samples. For example, the false positives of the predictive model may refer to a number of times the predictive model incorrectly classified a pixel(s) as depicting a particular attribute that in reality did not depict the particular attribute. Conversely, the false negatives of the machine learning model(s) may refer to a number of times the predictive model classified one or more pixels of an image of a core sample as not depicting a particular attribute when, in fact, the one or more pixels do depicting the particular attribute. True negatives and true positives may refer to a number of times the predictive model correctly classified one or more pixels of an image of a core sample as having sufficient depicting a particular attribute or not depicting the particular attribute. Related to these measurements are the concepts of recall and precision. Generally, recall refers to a ratio of true positives to a sum of true positives and false negatives, which quantifies a sensitivity of the predictive model. Similarly, precision refers to a ratio of true positives a sum of true and false positives.

Figure 10A:
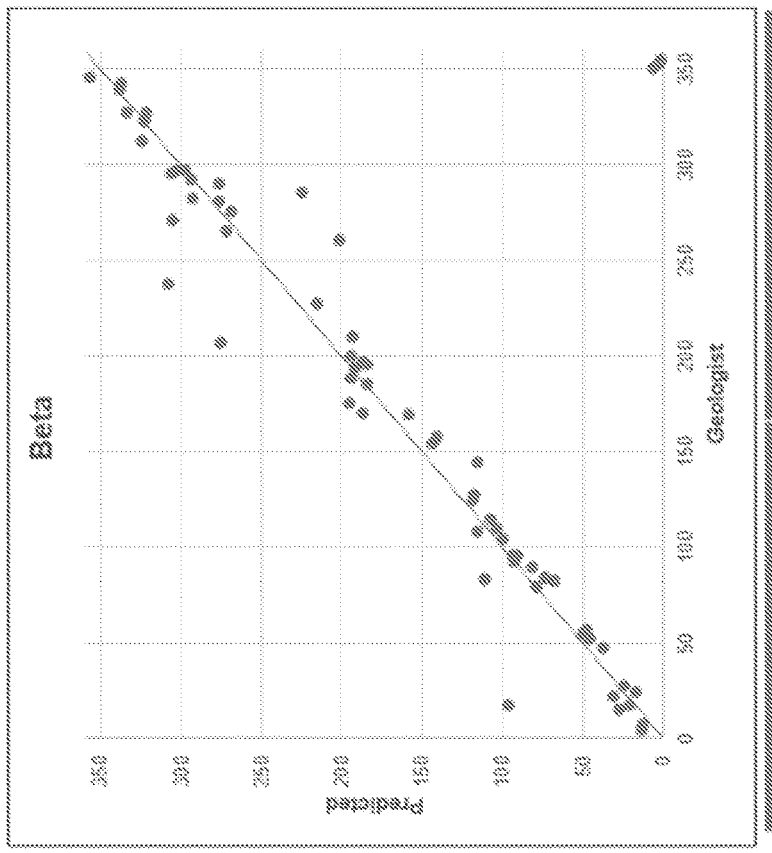
FIG. 10A shows an example graph.
Figure 10A:
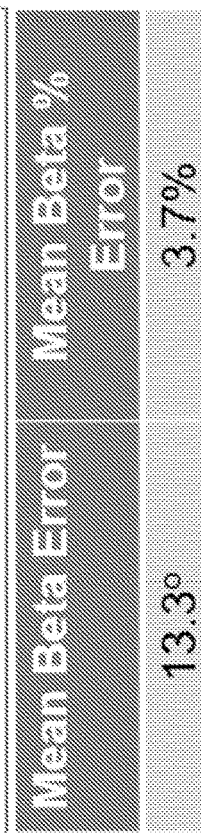
Figure 10B:
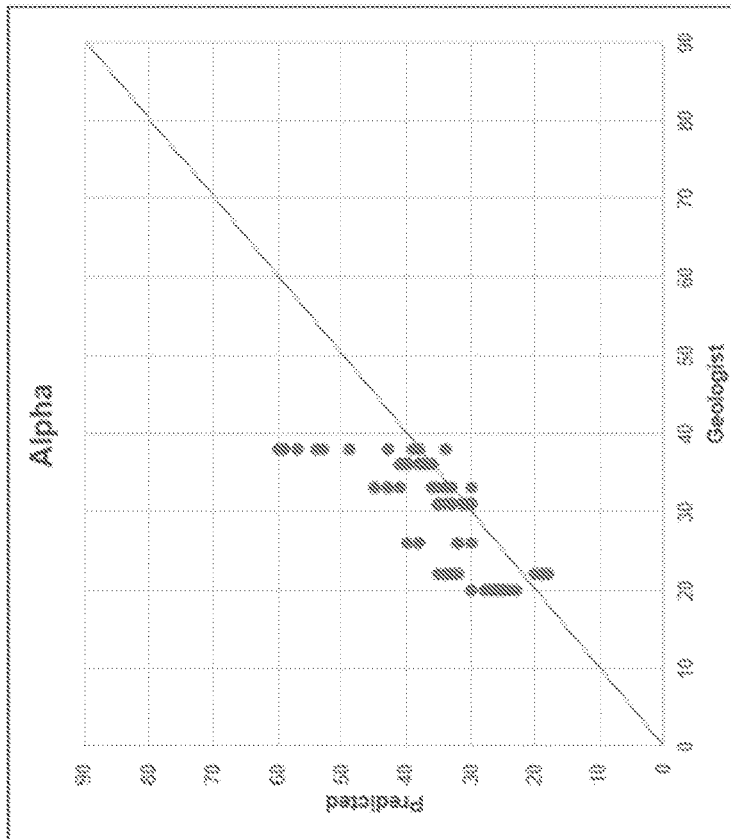
FIG. 10B shows an example graph.
Figure 10B:
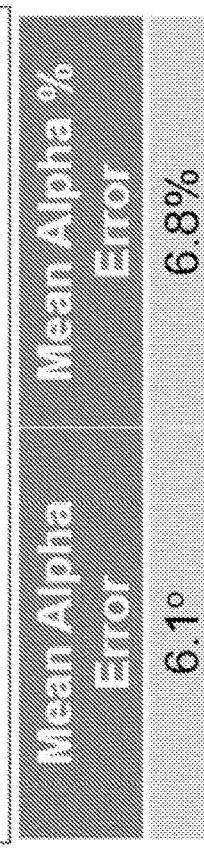

Further, the predictive model may be evaluated based on a level of mean error and a level of mean percentage error. For example, the predictive model may include an inference model. The inference model, as described herein, may be used to determine additional attributes associated with a core sample, such as an alpha angle and/or a beta angle. FIGS. 10A and 10B show example evaluations of the inference model's predictions for alpha and beta angles values as compared to a trained expert (e.g., a geologist).

Once a desired accuracy level of the predictive model is reached, the training phase ends and the predictive model may be output at step 990. When the desired accuracy level is not reached, however, then a subsequent iteration of the method 900 may be performed starting at step 910 with variations such as, for example, considering a larger collection of images of core samples.

Figure 11:
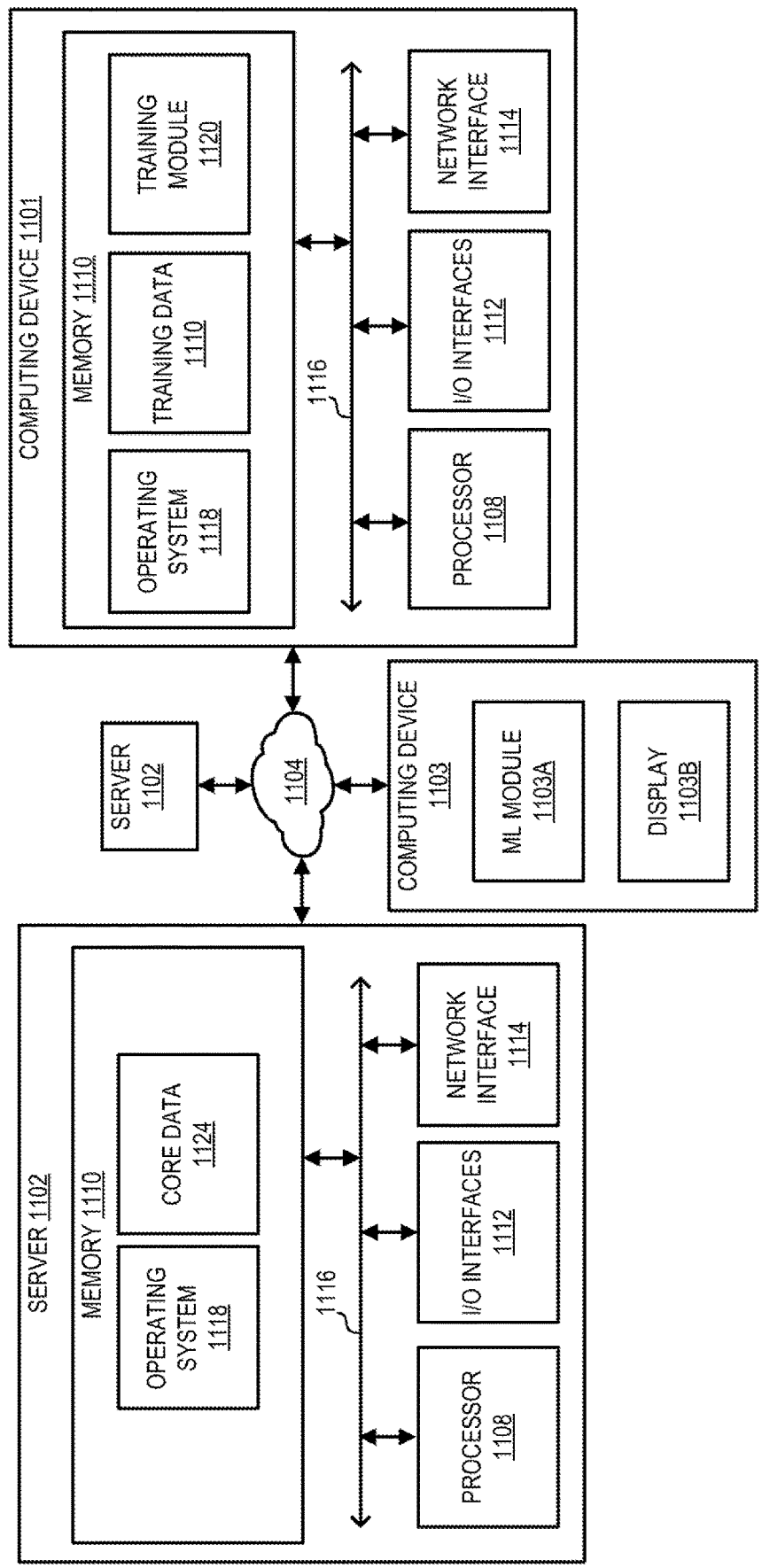
FIG. 11 shows an example system.

As discussed herein, the present methods and systems may be computer-implemented. FIG. 11 shows a block diagram depicting an environment 1100 comprising non-limiting examples of a computing device 1101 and a server 1102 connected through a network 1104. As an example, the server 104 and/or the computing device 106 of the system 100 may be a computing device 1101 and/or a server 1102 as described herein with respect to FIG. 11. In an aspect, some or all steps of any described method may be performed on a computing device as described herein. The computing device 1101 can comprise one or multiple computers configured to store one or more of the training module 1120, training data 1110 (e.g., labeled images/pixels), and the like. The server 1102 can comprise one or multiple computers configured to store core data 1124 (e.g., a plurality of images of core samples). Multiple servers 1102 can communicate with the computing device 1101 via the through the network 1104.

The computing device 1101 and the server 1102 can be a digital computer that, in terms of hardware architecture, generally includes a processor 1108, memory system 1110, input/output (I/O) interfaces 1112, and network interfaces 1114. These components (1108, 1110, 1112, and 1114) are communicatively coupled via a local interface 1116. The local interface 1116 can be, for example, but not limited to, one or more buses or other wired or wireless connections, as is known in the art. The local interface 1116 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1108 can be a hardware device for executing software, particularly that stored in memory system 1110. The processor 1108 can be any custom made or commercially available processor, a central processing unit (CPU), an auxiliary processor among several processors associated with the computing device 1101 and the server 1102, a semiconductor-based microprocessor (in the form of a microchip or chip set), or generally any device for executing software instructions. When the computing device 1101 and/or the server 1102 is in operation, the processor 1108 can be configured to execute software stored within the memory system 1110, to communicate data to and from the memory system 1110, and to generally control operations of the computing device 1101 and the server 1102 pursuant to the software.

The I/O interfaces 1112 can be used to receive user input from, and/or for providing system output to, one or more devices or components. User input can be provided via, for example, a keyboard and/or a mouse. System output can be provided via a display device and a printer (not shown). I/O interfaces 1112 can include, for example, a serial port, a parallel port, a Small Computer System Interface (SCSI), an infrared (IR) interface, a radio frequency (RF) interface, and/or a universal serial bus (USB) interface.

The network interface 1114 can be used to transmit and receive from the computing device 1101 and/or the server 1102 on the network 1104. The network interface 1114 may include, for example, a 11BaseT Ethernet Adaptor, a 110BaseT Ethernet Adaptor, a LAN PHY Ethernet Adaptor, a Token Ring Adaptor, a wireless network adapter (e.g., WiFi, cellular, satellite), or any other suitable network interface device. The network interface 1114 may include address, control, and/or data connections to enable appropriate communications on the network 1104.

The memory system 1110 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 1110 may incorporate electronic, magnetic, optical, and/or other types of storage media. Note that the memory system 1110 can have a distributed architecture, where various components are situated remote from one another, but can be accessed by the processor 1108.

The software in memory system 1110 may include one or more software programs, each of which comprises an ordered listing of executable instructions for implementing logical functions. In the example of FIG. 11, the software in the memory system 1110 of the computing device 1101 can comprise the training module 820 (or subcomponents thereof), the training dataset 810A, the training dataset 810B, and a suitable operating system (O/S) 1118. In the example of FIG. 11, the software in the memory system 1110 of the server 1102 can comprise, the core data 1124, and a suitable operating system (O/S) 1118. The operating system 1118 essentially controls the execution of other computer programs and provides scheduling, input-output control, file and data management, memory management, and communication control and related services.

The environment 1100 may further comprise a computing device 1103. The computing device 1103 may be a computing device and/or system, such as the server 104 and/or the computing device 106 of the system 100. The computing device 1103 may use a predictive model stored in a Machine Learning (ML) module 1103A to classify one or more pixels of images of core samples as depicting or not depicting a particular attribute(s). The computing device 1103 may include a display 1103B for presentation of a user interface, such as the user interface described herein with respect to FIGS. 1-6.

For purposes of illustration, application programs and other executable program components such as the operating system 1118 are illustrated herein as discrete blocks, although it is recognized that such programs and components can reside at various times in different storage components of the computing device 1101 and/or the server 1102. An implementation of the training module 820 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Turning now to FIG. 12, a flowchart of an example method 1200 for improved core sample analysis is shown. The method 1200 may be performed in whole or in part by a single computing device, a plurality of computing devices, and the like. For example, the server 104 and/or the computing device 106 of the system 100, the training module 820 of the system 800, and/or the computing device 1103 may be configured to perform the method 1200.

At step 1210, a computing device may receive a plurality of core images. The plurality of core images may comprise core images for a plurality of core samples. Each core image of the plurality of core images may include at least one image of a corresponding core sample of the plurality of core samples. For example, each core image of the plurality of core images may include one image, or each core image may include multiple images of the corresponding core sample that are "stitched" together and analyzed as a single overall image of the core sample.

At step 1220, one or more attributes associated with each of the core samples may be determined. The one or more attributes may be one or more structural features, such as one or more core edges, an orientation line, one or more fractures, one or more broken zones, one or more beddings, or one or more veins. A machine learning model may analyze the at least one image of each corresponding core sample of the plurality of core samples and determine the one or more attributes associated with each of the plurality of core samples. The one or more attributes may be based on the one or more structural features of the plurality of core samples. The machine learning model may be resident at the computing device or at another computing device in communication with the computing device. The machine learning model may be a semantic segmentation model that is trained according to the methods described herein. The semantic segmentation model may utilize one or more of a naïve Bayes classifier, a support vector machine, a decision tree, a neural network, a combination thereof, and/or the like.

At step 1230, an output image may be provided. For example, the computing device may provide the output image via a user interface, such as the user interface described herein with respect to FIGS. 1-6. The output image may relate to a first core image of the plurality of core images. The output image may include the first core image and an overlay of a segmentation mask. The segmentation mask may be generated by the machine learning model based on the one or more attributes associated with the first core image. The segmentation mask may be indicative of the one or more attributes associated with the first core image.

The computing device may receive an indication of one or more user edits associated with the output image. For example, a user of the computing device may interact with the output image and/or the segmentation mask via the user interface. The one or more user edits may include an adjustment of at least one attribute of the one or more attributes, at least one adjustment of the overlay of the segmentation mask, at least one user-defined attribute associated with the at least one image of the core sample, at least one user-defined attribute associated with the segmentation mask, a combination thereof, and/or the like.

The computing device may provide an indication of the one or more user edits to a server. The server may be associated with training/configuring the machine learning model. The one or more user edits and/or expert annotation associated with the one or more user edits may be used to optimize the machine learning model. The expert annotation may include an indication of an acceptance of the one or more user edits, a rejection of the one or more user edits, or an adjustment to the one or more user edits. The one or more user edits and/or expert annotation associated with the one or more user edits may be used to retrain the semantic segmentation model.

An inference model may be used to determine additional attributes associated with a core sample. The inference model may be resident on the computing device or on a third-party computing device/server in communication with the computing device. For example, the inference model may generate one or more ellipses associated with at least one of the one or more attributes (e.g., fracture, vein, etc.). The additional attributes may be an alpha angle and/or a beta angle associated with the at least one attribute. For example, the inference model may fit an ellipse to the at least one attribute. Based on an orientation of the ellipse in relation to an orientation line of the core sample and/or edges/boundaries of the core sample, the inference model may determine the alpha angle and/or the beta angle for the at least one attribute.

The computing device may receive orientation data (e.g., survey/excavation data) associated with the core sample. The orientation data may be provided to the computing device by the user or by a third-party computing device (e.g., server, etc.). The orientation data associated with the core sample may be used along with the alpha angle and/or the beta angle to determine a strike angle and/or a dip angle associated with the at least one attribute of the core sample. The computing device may determine a RQD for the core sample based on at least one attribute of the one or more attributes and/or at least one attribute of the additional attributes. The orientation data, the one or more attributes, and/or the additional attributes may be stored at a server by the computing device.

Turning now to FIG. 13, a flowchart of an example method 1300 for improved core sample analysis is shown. The method 1300 may be performed in whole or in part by a single computing device, a plurality of computing devices, and the like. For example, the server 104 and/or the computing device 106 of the system 100, the training module 820 of the system 800, and/or the computing device 1103 may be configured to perform the method 1300.

At step 1310, a computing device may receive at least one image of a core sample. The at least one image of the core sample may be multiple images of the corresponding core sample that are "stitched" together and analyzed as a single overall image of the core sample. One or more attributes associated with the core sample may be determined. The one or more attributes may be one or more structural features, such as one or more core edges, an orientation line, one or more fractures, one or more broken zones, one or more beddings, or one or more veins. A machine learning model may analyze the at least one image the core sample and determine the one or more attributes associated with the core sample. The one or more attributes may be based on the one or more structural features of the core sample. The machine learning model may be resident at the computing device or at another computing device in communication with the computing device. The machine learning model may be a semantic segmentation model that is trained according to the methods described herein. The semantic segmentation model may utilize one or more of a naïve Bayes classifier, a support vector machine, a decision tree, a neural network, a combination thereof, and/or the like.

At step 1320, the semantic segmentation model may generate a segmentation mask. The segmentation mask may be indicative of the one or more attributes associated with the at least one image of the core sample. At step 1330, an output image may be provided. For example, the computing device may provide the output image via a user interface, such as the user interface described herein with respect to FIGS. 1-6. The output image may relate to a first core image of the plurality of core images. The output image may include the first core image and an overlay of the segmentation mask.

At step 1340, the computing device may receive an indication of one or more user edits associated with the output image. For example, a user of the computing device may interact with the output image and/or the segmentation mask via the user interface. The one or more user edits may comprise an adjustment of at least one attribute of the one or more attributes, at least one adjustment of the overlay of the segmentation mask, at least one user-defined attribute associated with the at least one image of the core sample, or at least one user-defined attribute associated with the segmentation mask.

At step 1350, the computing device may train the semantic segmentation model. For example, the computing device may train the semantic segmentation model based on the indication of the one or more user edits. The computing device may train the semantic segmentation model based on expert annotation associated with the one or more user edits. The expert annotation may include an indication of an acceptance of the one or more user edits, a rejection of the one or more user edits, or an adjustment to the one or more user edits. The one or more user edits and/or expert annotation associated with the one or more user edits may be used to retrain the semantic segmentation model. For example, the semantic segmentation model may be a previously-trained machine learning model. Based on the indication of the one or more user edits and/or the expert annotation, the semantic segmentation model may be re-trained/optimized.

The re-trained/optimized semantic segmentation model may generate a second segmentation mask. The second segmentation mask may be indicative of the one or more attributes associated with the at least one image of the core sample and the one or more user edits. A second output image may be provided via the user interface of the computing device. The second output image may comprise the at least one image of the core sample and an overlay of the second segmentation mask.

An inference model may be used to determine additional attributes associated with a core sample. The inference model may be resident on the computing device or on a third-party computing device/server in communication with the computing device. For example, the inference model may generate one or more ellipses associated with at least one of the one or more attributes (e.g., fracture, vein, etc.). The additional attributes may be an alpha angle and/or a beta angle associated with the at least one attribute. For example, the inference model may fit an ellipse to the at least one attribute. Based on an orientation of the ellipse in relation to an orientation line of the core sample and/or edges/boundaries of the core sample, the inference model may determine the alpha angle and/or the beta angle for the at least one attribute.

The computing device may receive orientation data (e.g., survey/excavation data) associated with the core sample. The orientation data may be provided to the computing device by the user or by a third-party computing device (e.g., server, etc.). The orientation data associated with the core sample may be used along with the alpha angle and/or the beta angle to determine a strike angle and/or a dip angle associated with the at least one attribute of the core sample. The computing device may determine a RQD for the core sample based on at least one attribute of the one or more attributes and/or at least one attribute of the additional attributes. The RQD for the core sample, the orientation data, the one or more attributes, and/or the additional attributes may be stored at a server by the computing device.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
receiving, by a computing device, a plurality of core images for a plurality of core samples, wherein each core image of the plurality of core images comprises at least one image of a core sample of the plurality of core samples;
determining, by a machine learning model, based on each core image of the plurality of core images, an orientation line for each core sample of the plurality of core samples;
generating, by the machine learning model, based on the orientation line associated with each core sample of the plurality of core samples, one or more ellipses associated with one or more points of each core sample of the plurality of core samples;
determining, based on the one or more ellipses associated with the one or more points of each core sample of the plurality of core samples, one or more attributes of each core sample of the plurality of core samples; and
providing, at a user interface, for a first core image of the plurality of core images, an output image comprising the at least one image of the core sample and an overlay of a segmentation mask, wherein the segmentation mask is indicative of the one or more attributes associated with the first core image.

2. The method of claim 1, wherein the machine learning model comprises one or more of: an inference model, a segmentation model, or a convolutional neural network.

3. The method of claim 1, wherein the one or more attributes comprise one or more core edges, one or more fractures, one or more broken zones, one or more beddings, or one or more veins.

4. The method of claim 1, further comprising:
generating, based on the one or more attributes associated with the first core image, the segmentation mask.

5. The method of claim 1 further comprising:
receiving, via the user interface, an indication of one or more user edits associated with the output image; and
training, based on the indication of the one or more user edits, the machine learning model.

6. The method of claim 5, wherein the one or more user edits comprise an adjustment of: at least one attribute of the one or more attributes, at least one adjustment of the overlay of the segmentation mask, at least one user-defined attribute associated with the at least one image of the core sample, or at least one user-defined attribute associated with the segmentation mask.

7. The method of claim 1, wherein determining the one or more attributes of each core sample of the plurality of core samples comprises comprises:
determining, based on an orientation of the one or more ellipses in relation to the orientation line, a beta angle associated with the one or more points of each core sample of the plurality of core samples;

determining, based on the one or more ellipses and an axis of each core sample of the plurality of core samples, an alpha angle associated with the one or more points of each core sample of the plurality of core samples; and determining, based on each alpha angle and each beta angle, the one or more attributes of each core sample of the plurality of core samples.

8. A method comprising:

determining, by a machine learning model, based on at least one image of a core sample, an orientation line for the core sample;

determining, by the machine learning model, based on one or more ellipses associated with one or more points of the core sample, one or more attributes of the core sample, wherein the one or more ellipses are based on the orientation line and the one or more points of the core sample;

generating, by the machine learning model, a segmentation mask indicative of the one or more attributes;

providing, via a user interface, an output image comprising the at least one image of the core sample and an overlay of the segmentation mask;

receiving, via the user interface, an indication of one or more user edits associated with the output image; and training, based on the indication of the one or more user edits, the machine learning model.

9. The method of claim 8, wherein training the machine learning model comprises:

receiving expert annotation associated with the one or more user edits; and training, based on the expert annotation, the machine learning model.

10. The method of claim 9, wherein the expert annotation comprises an indication of an acceptance of the one or more user edits, a rejection of the one or more user edits, or an adjustment to the one or more user edits.

11. The method of claim 8, wherein the one or more attributes comprise one or more core edges, one or more fractures, one or more broken zones, one or more beddings, or one or more veins.

12. The method of claim 8, wherein the one or more user edits comprise: an adjustment of at least one attribute of the one or more attributes, at least one adjustment of the overlay of the segmentation mask, at least one user-defined attribute associated with the at least one image of the core sample, or at least one user-defined attribute associated with the segmentation mask.

13. The method of claim 8, wherein the machine learning model comprises a trained segmentation model, and wherein training, based on the indication of the one or more user edits, the machine learning model comprises: re-training, based on the indication of the one or more user edits, the trained segmentation model.

14. The method of claim 13, further comprising:

generating, based on the re-trained segmentation model, a second segmentation mask indicative of:

the one or more attributes associated with the at least one image of the core sample, and the one or more user edits; and providing, via the user interface, a second output image comprising the at least one image of the core sample and an overlay of the second segmentation mask.

15. A system comprising:

a computing device configured to receive at least one image of a core sample;

a machine learning module configured to:

determine, based on at least one image of a core sample, an orientation line for the core sample;

determine, based on one or more ellipses associated with one or more points of the core sample, one or more attributes of the core sample, wherein the one or more ellipses are based on the orientation line and the one or more points of the core sample; and generate a segmentation mask indicative of the one or more attributes;

a user interface configured to:

provide an output image comprising the at least one image of the core sample and an overlay of the segmentation mask; and receive an indication of one or more user edits associated with the output image; and the machine learning module further configured to train, based on the indication of the one or more user edits, the machine learning model.

16. The system of claim 15, wherein the machine learning module is further configured to:

receive expert annotation associated with the one or more user edits; and retrain, based on the expert annotation, the machine learning model.

17. The system of claim 16, wherein the expert annotation comprises an indication of an acceptance of the one or more user edits, a rejection of the one or more user edits, or an adjustment to the one or more user edits.

18. The system of claim 15, wherein the one or more attributes comprise one or more core edges, one or more fractures, one or more broken zones, one or more beddings, or one or more veins.

19. The system of claim 15, wherein the one or more user edits comprise: an adjustment of at least one attribute of the one or more attributes, at least one adjustment of the overlay of the segmentation mask, at least one user-defined attribute associated with the at least one image of the core sample, or at least one user-defined attribute associated with the segmentation mask.

20. The system of claim 15, wherein the machine learning model comprises a trained segmentation model, and wherein the machine learning module is further configured to train, based on the indication of the one or more user edits, the machine learning model by: re-training, based on the indication of the one or more user edits, the trained segmentation model.

* * * * *